(12) United States Patent
Feigin et al.

(10) Patent No.: US 7,816,894 B2
(45) Date of Patent: Oct. 19, 2010

(54) METHOD AND APPARATUS FOR REGULATING VOLTAGE

(75) Inventors: Lev Z. Feigin, Obninsk (RU); Petr L. Kosoy, Obninsk (RU); Dmitriy A. Klavsuts, Novosibirsk (RU); Suleyman V. Levinzon, Darmstadt (RU)

(73) Assignee: Electro-Chance, LLC, The Plains, VA (US)

( * ) Notice: Subject to any disclaimer, the term of this patent is extended or adjusted under 35 U.S.C. 154(b) by 533 days.

(21) Appl. No.: 11/766,029

(22) Filed: Jun. 20, 2007

(65) Prior Publication Data

US 2007/0296390 A1    Dec. 27, 2007

Related U.S. Application Data

(60) Provisional application No. 60/805,712, filed on Jun. 23, 2006.

(51) Int. Cl.
*G05F 1/12* (2006.01)
(52) U.S. Cl. .................. 323/247; 323/255; 323/258
(58) Field of Classification Search ............. 323/247, 323/251, 255, 256, 257, 258
See application file for complete search history.

(56) References Cited

U.S. PATENT DOCUMENTS

| | | | |
|---|---|---|---|
| 5,545,971 A | | 8/1996 | Gomez et al. |
| 5,602,462 A | * | 2/1997 | Stich et al. .................. 323/258 |
| 6,020,726 A | | 2/2000 | James |
| 6,046,549 A | | 4/2000 | James |
| 6,236,192 B1 | * | 5/2001 | Suzuki et al. ............... 323/239 |

FOREIGN PATENT DOCUMENTS

| | | |
|---|---|---|
| RU | 2 130 689 | 5/1999 |
| RU | 2 155 424 | 8/2000 |
| RU | 2 157 039 | 9/2000 |
| RU | 2 158 954 | 11/2000 |
| RU | 2 183 375 | 6/2002 |
| RU | 2 208 284 | 7/2003 |
| RU | 2 208 285 | 7/2003 |
| RU | 2 229 764 | 5/2004 |
| RU | 2 237 270 | 9/2004 |
| RU | 2 242 829 | 12/2004 |
| RU | 2 271 059 | 2/2006 |

\* cited by examiner

*Primary Examiner*—Jessica Han
(74) *Attorney, Agent, or Firm*—Greenlee Sullivan PC (57) ABSTRACT

An AC voltage regulator able to provide a desired voltage to any type of a given load within a predetermined range without any output power interruptions during any transition time, without distortion of the AC sine wave and without high current circulating through the circuit components during the voltage switching. The voltage regulator uses a single regulator transformer having a primary winding and a secondary winding. The secondary winding of the regulator transformer is connected in series between a power source and the load, while the primary winding of the regulator transformer is connected with the power source so that the primary and secondary windings have opposite polarities. The position of a plurality of switches can be variably set by the control circuit to control current flow through the primary winding and to provide a normal mode, a step-down mode, or a step-up mode.

19 Claims, 3 Drawing Sheets

METHOD AND APPARATUS FOR REGULATING VOLTAGE

CROSS-REFERENCE TO RELATED APPLICATIONS

This application claims benefit of U.S. Provisional Application No. 60/805,712, filed Jun. 23, 2006, which is incorporated in its entirety herein to the extent that there is no inconsistency with the present disclosure.

BACKGROUND OF THE INVENTION

This invention generally pertains to voltage regulators, and more particularly AC voltage regulators able to provide a desired AC voltage to any type of a given load, without any output power interruptions during any regulation period and without distortion of the AC sine wave. The benefits associated with the use of the present invention include reduced size and cost of the voltage regulating devices, reduced electrical energy consumption and increased equipment life in electrical installations.

A voltage regulator is designed to deliver and automatically maintain a constant voltage level to a load. If the incoming voltage is too high or too low compared to a desired predetermined range, the voltage regulator will reduce or increase the voltage so that the output voltage falls within the range. Such voltage regulators are used to provide a steady voltage level to a load independent of variations in the voltage transmitted from the power source, which can cause the voltage to fall above or below the desired output. This is especially important to sensitive electrical devices that may become damaged if the voltage is not maintained properly. Additionally, voltage regulators can be used as energy saving devices by stably delivering a lower range of voltage to a load that still falls within the operational voltage range.

Voltage regulators often utilize transformers or autotransformers with multiple taps to adjust the voltage. Voltage regulators also typically use a number of high frequency switches and relays to direct the current passing through the device in order to maintain the voltage, or to step-up or step-down the voltage. Problems arise when the device switches from one mode of operation to another mode (for example, switching from normal mode to a step-up mode) momentarily disconnecting the power source from the load or producing transient currents that electrically saturate part of the circuit. This can cause momentary power interruptions or overload parts of the circuit causing damage to the device.

Several patents have tried to overcome these deficiencies. U.S. Pat. No. 5,545,971, U.S. Pat. No. 6,020,726, and U.S. Pat. No. 6,046,549, for example, disclose voltage regulators utilizing a single regulator transformer having a primary winding and a secondary winding. Further, a relay or plurality of high frequency AC switches are included so as to variably set a plurality of connection modes to maintain either step-up, step-down modes or a short-circuit mode where voltage passes through the secondary winding of the transformer with the primary winding being completely isolated from the secondary winding. With higher power, the circuit will face typical disadvantages such as oversaturation without appreciable voltage regulation during the switching transient, wave form distortion and questionable dependability. None of these devices disclose a means for preventing electrical overloads or power interruptions during the brief periods when the switches or relays switch from one configuration to another. Thus, it is unlikely these systems can be widely used with industrial systems.

What is needed is a high efficiency voltage regulator suitable for use with both high and low rated power that is also able to switch between different modes of operation without damage to the device or loss of power. It is preferable that such a device provide regulated voltage for AC power without a distorted waveform output. The purpose of the present invention is to provide an improved power switching circuit and a voltage regulator containing such a power switching circuit.

SUMMARY OF THE INVENTION

The present invention addresses the above deficiencies associated with the prior art and discloses a voltage regulator and methods of regulating voltage providing any type of a given electrical load with a desired voltage output within a predetermined range. The AC voltage regulator in accordance with one embodiment of the present invention performs with any loads without any power interruptions during any transition time, without distortion of the AC sine wave, and without harmful high amounts of current circulating through the circuit components during switching.

One embodiment of the invention is an AC voltage regulator, providing any electrical load with a desired voltage output within a predetermined range. The voltage regulator uses a single regulator transformer having a primary winding and a secondary winding. The secondary winding of the regulator transformer is connected in series between an AC power source and the load. The primary winding of the regulator transformer is connected with the AC power source in such a manner that the primary and secondary windings have opposite polarities. A plurality of switches is utilized to control current flow through the primary winding of the regulator transformer. The position of the switches can be variably set by the control circuit to provide a normal mode, a step-down mode, or a step-up mode. The regulator transformer performs as a "boosting" or "bucking" autotransformer (step-up and step-down modes, respectively) or as an impedance (choke) coil with the parallel windings in electrical communication with each other (normal mode). This provides regulated output voltage in such a way that the bulk of electrical power (up to 100%) is transferred to the load via electrical coupling and significantly less (or 0%) is transferred via electromagnetic coupling. The ratio of the amount of energy transferred by electrical coupling versus electromagnetic coupling depends on the transformation ratio of the regulator transformer. The bigger the transformation ratio is the more energy is transferred to the load by way of electric coupling. For example, the transformation ratio of the regulator transformer is $$i = \frac{120\ \text{V}}{6\ \text{V}} = 20,$$

then for a "boosting" or "bucking" transformer it will be equal to $$i_{auto} = \frac{(120\ \text{V} \pm 6\ \text{V})}{120\ \text{V}} = 0.95 \div 1.05$$

or close to 1, which means that 95% of electrical power is transferred to the load via electrical coupling and significantly less (5% or 1/20) via electromagnetic coupling. Thus, the rated power of the regulator transformer will be equal to 1/20 or 5% of the load rated power. The low rated power of the regulator transformer provides all the advantages associated with the achievement of this invention including very high efficiency (99.5% or greater), reduced sizing, weight and as a result lower manufacturing cost as well as reduced energy consumption and cost, and prolonged equipment life.

One embodiment of the present invention provides a voltage regulator comprising a power source input suitable to being electrically connected to a power source, a load output suitable to being electrically connected to a load, a power circuit and a control circuit. In a further embodiment, the voltage regulator is able to regulate three phase power using three power circuits with a single control circuit or control each phase independently using three separate control circuits. Each power circuit comprises a regulator transformer having a primary winding and a secondary winding, wherein the secondary winding is connected in series with the power source input and the load output and the primary winding is connected with the AC power source such that the primary winding and the secondary winding have opposite polarities. The power circuit also comprises a first power switch positioned between the input of the secondary winding and the output of the primary winding; a second power switch positioned between the input of the primary winding and the output of the secondary winding; a third power switch positioned between the output of the primary winding and the common return; and a fourth power switch positioned between the input of the primary winding and the common return.

When the first and second power switches are closed and the third and fourth power switches are open, the primary and secondary windings are in parallel, electrically coupled to each other and the voltage across the load output to be approximately equal to the power source voltage (normal mode). When the second and third power switches are closed and the first and fourth power switches are open, the voltage across the load output is approximately equal to the difference between the voltage from the power source input and the voltage induced by the primary winding in the secondary winding (step-down mode). When the first and fourth power switches are closed and the second and third power switches are open, the voltage across the load output is approximately equal to the sum between the voltage from the power source input and the voltage induced by the primary winding in the secondary winding (step-up mode).

In a further embodiment, the power circuit comprises a plurality of RC circuits (resistor-capacitor circuits) comprising capacitors and resistors connected in series with each other and connected in parallel with the power switches. Preferably, there is an RC circuit connected in parallel with the first power switch and located between the power source input and a point of connection between the first power switch and the output of the primary winding; an RC circuit connected in parallel with the second power switch and located between the load output and a point of connection between the second power switch and the input of the primary winding; an RC circuit connected in parallel with the third power switch and located between the common return and the point of connection between the third power switch and the output of the primary winding; and an RC circuit connected in parallel with the fourth power switch and located between the common return and the point of connection between the fourth power switch and the input of the primary winding. In this way, both the primary winding and secondary winding are continuously in electrical contact with the power source and the load, thereby eliminating power interruptions during switching and preventing a single part of the circuit from becoming overloaded.

Additionally, the power circuit may include a tapped relay having one or more tap points coupled to the primary winding. By switching which tap point is connected, the transformer ratio of the regulator transformer can be adjusted. The ratio of turns between the primary winding and secondary winding defines the predetermined range for the desired output voltage. Preferably, the optimal predetermined range is a service voltage supplied by utilities within established operating tolerances. The power circuit provides regulated AC voltage to a load within a predetermined range regardless of the variations of the AC power source voltage. Voltage delivered to the load either can fall within a certain range required by a customer or can be maintained at the lower limit of the predetermined range for the energy saving purposes.

In one embodiment, the voltage regulator regulates AC voltage and comprises a power circuit, a control circuit and a combined protection circuit. The power circuit provides regulated AC voltage to a load within a predetermined range regardless of the variations of the AC power source voltage. Voltage delivered to the load either can fall within a certain range required by a customer or can be maintained at the lower limit of the service voltage regulated by the standards for optimal AC voltage regulator operation. The power circuit performs the voltage regulation without any output power interruptions during any transition time, without distortion of the AC sine wave, and without high amounts of current circulating through the circuit components during voltage switching. The control circuit monitors an input voltage entering the AC voltage regulator from the AC power source and compares the input voltage to the predetermined output voltage and initiates the appropriate voltage switching in the power circuit resulting in the desired voltage output within the predetermined range. The combined protection circuit can be placed either between the power source and the voltage regulator or the voltage regulator and the load providing protection from damage caused by short circuits in the voltage regulator and the load, respectively, current overload, phase shift, change in input voltage outside the allowed range, increase in internal temperature of the voltage regulator, or other acoustic or optical emergency indication. Types of protection circuits suitable for use with the present invention are well known in the art.

One embodiment of the present invention also provides a method of regulating voltage from a power source to a load comprising measuring an input voltage from an AC power source; outputting a control signal from a control circuit to a power circuit; and producing a desired voltage at the load within a predetermined range. In a further embodiment measuring the input voltage includes reducing the input voltage using a step-down transformer in the control circuit, followed by rectifying the reduced input voltage using a diode bridge, producing a constant voltage having a regulated magnitude at the diagonal of an unbalanced resistive bridge; and then analyzing the transformed input voltage (preferably by a microcontroller).

In another further embodiment, outputting a control signal to the power circuit comprises selectively activating one or more power switches in the power circuit; redirecting a current through the power circuit so that the primary winding induces a voltage in the secondary winding. In one mode of operation, activating the power switches causes the power circuit to operate in a step-up mode when the measured input voltage is below the predetermined range causing the voltage across the load output to be approximately equal to a sum between the voltage from the power source input and the voltage induced by the primary winding in the secondary winding. In another mode of operation, activating the power switches causes the power circuit to operate in a step-down mode when the measured input voltage is above the predetermined range causing the voltage across the load output to be approximately equal to a difference between the voltage from the power source input and the voltage induced by the primary winding in the secondary winding. Additionally, an electrical connection between the primary winding and the AC power source during the transition from the normal mode of operation to the step-up or step-down mode of operation and reverse is maintained via a plurality RC circuits and a capacitor.

During the switching transition from the "normal" connection mode to the "step-up" or "step-down" connection mode, the primary winding is never disconnected due to its electrical communication with the power source through the RC circuits connected in parallel with the switches. Thus, the regulator transformer is never saturated which eliminates a potential failure in the primary winding insulation due to an overvoltage. Further, while switching back to the normal connection mode the primary winding is connected in parallel to the secondary winding through the RC circuits and switches. The transient current during the switching transition is reduced nearly 10 times compared to arrangements where the primary winding is short-circuited. As a result, no sparking, burning contacts or other known disadvantages are observed during the switching transition, which significantly increases the reliability of systems utilizing the present invention.

In some embodiments, a voltage regulator of the present invention can perform as a 1) step-up device, 2) a step-down device, or a 3) step-up and step-down device.

A voltage regulator of the present invention will perform as an electric saving device while in step-down connection mode. The optimum saving and performance can be achieved by maintaining an output voltage at the lower limit of the service voltage supplied by utilities within established operating tolerances, whereby a transformation ratio of the regulator transformer defines the predetermined range of the output voltage.

The AC voltage regulator of the present invention will efficiently regulate the output voltage regardless of the variations of the AC power source or the load. The voltage regulating concept of the current invention can be implemented in any phase electric circuit arrangements either with an isolated neutral or floating neutral.

An AC voltage regulator further may comprise n-power circuits connected in series (for example the voltage regulator may comprise two power circuits connected in series) and 2n-control circuits to provide very smooth and precise regulation of each phase independently, for example for high precision electronics.

Additional applications and advantages of the present invention will become apparent from the following description and the accompanying drawings. It is understood that changes in the specific structure shown and described may be made without departing from the scope and spirit of the invention.

DETAILED DESCRIPTION OF THE INVENTION

The present invention will now be described more specifically with references to the figures. It is to be noted that the following descriptions of preferred embodiments of this invention are presented herein for purposes of illustration and description only; it is not intended to be exhaustive or to be limited to the precise forms disclosed, since the voltage regulator according to the invention may be advantageously used and modified in various fields.

Figure 1:
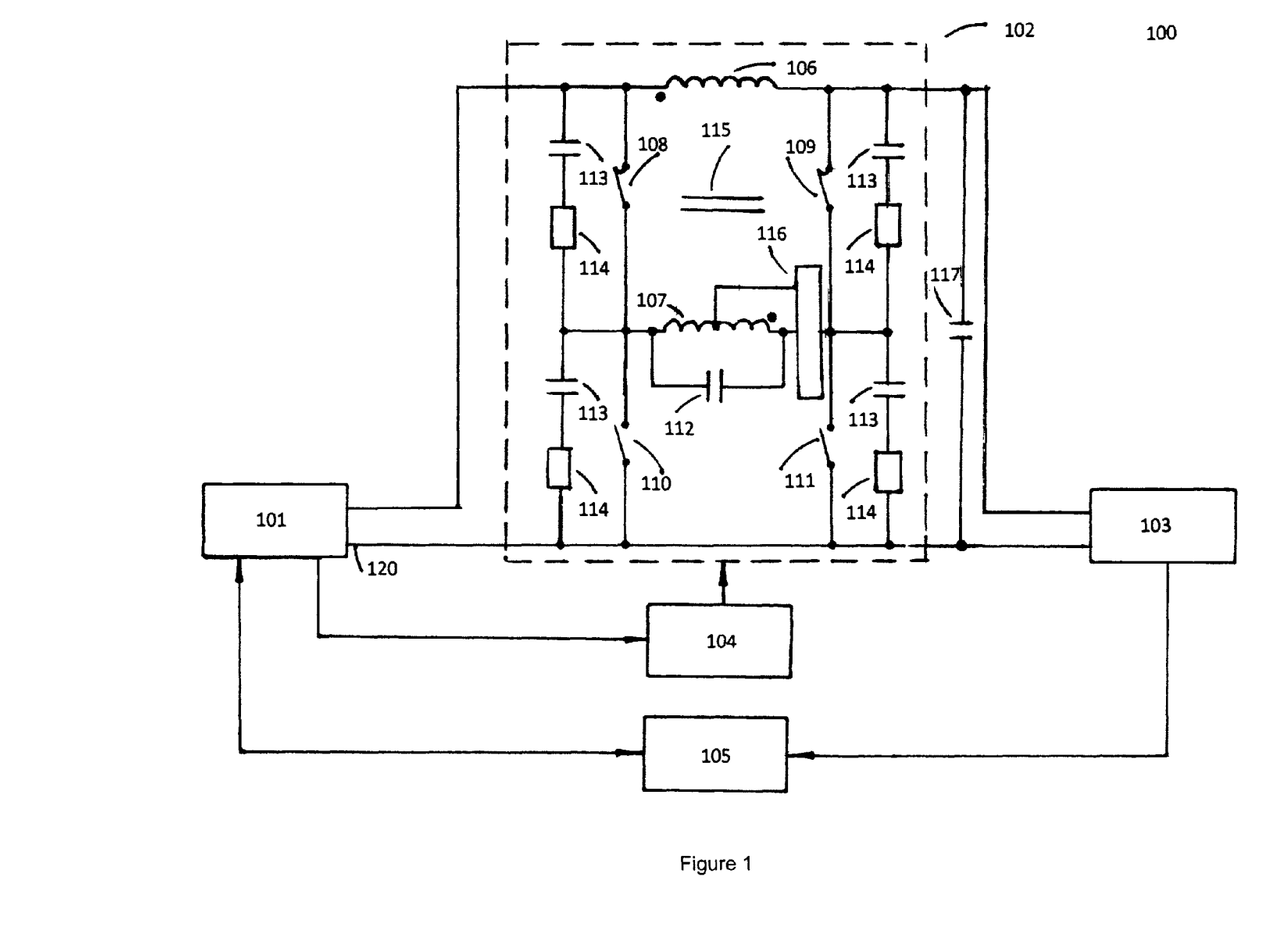
FIG. 1 is a schematic of a single phase AC voltage regulator in one embodiment of the present invention comprising a power circuit.

FIG. 1 illustrates a voltage regulator 100 in one embodiment of the present invention comprising a power circuit 102 and a control circuit 104. The voltage regulator 100 has an input that is electrically connected with the AC power source 101 in any conventional manner and an output that is connected with the electrical load 103. The control circuit 104 can be any control circuit known in the art and is electrically connected with the power circuit 102 and the AC power source 101. A protection circuit 105 is also electrically connected with the AC power source 101 and the electrical load 103.

As used herein, electrically connected means two or more components of a circuit or electrical device are connected so that electrical current is able to pass from one component to the other. Two or more components that are electrically connected to each other may have additional objects or components placed between them.

The power circuit 102 comprises a regulator transformer 115, power switches 108, 109, 110 and 111, a first capacitor 112, a second capacitor 117, a tapped relay 116 and RC circuits comprising RC capacitors 113 and RC resistors 114. The power circuit 102 produces the regulated AC voltage at its output within a predetermined range. The load 103 can be any electrical load.

The regulator transformer 115 comprises a primary winding 107 and a secondary winding 106. The secondary winding 106 is connected in series with the AC power source 101 and the electrical load 103. The primary winding 107 is connected to the AC power source 101 such that the primary winding 107 and the secondary winding 106 have opposite polarities (as shown by the dots in FIG. 1), thus, providing the number of connection modes for the appropriate voltage regulation through the variably set power switches 108, 110 and 109, 111.

As shown in FIG. 1, power switch 108 is coupled between the output of the primary winding 107 and the input of the secondary winding 106. Power switch 109 is coupled between the output of the secondary winding 106 and the input of the primary winding 107, power switch 110 is coupled between the output of the primary winding 107 and the common return 120, power switch 111 is coupled between the input of the primary winding 107 and the common return 120. Power switches 108 and 109 are preferably normally closed, and switches 110 and 111 are normally open. The variably set positions of the switches control the current flow through the system. Any switch or relay known in the art can be used. Preferably, small and reliable electromechanical switches can be used for the purpose of this invention, although many present art switch arrangements can be utilized also.

The first capacitor 112 is in parallel with the primary winding 107 of the regulator transformer 115. At one end the first capacitor 112 is connected to the output of the primary winding 107, at another end it is connected to the input of the primary winding 107 as shown in FIG. 1. The second capacitor 117 is connected to the output of the secondary winding 106 and to the common return 120. The second capacitor 117 is in parallel with the load 103 and serves for reactive current compensation (full or partial), decreasing nominal current and power of the voltage regulator and as result its cost.

The tapped relay 116, having one or more tap points coupled to the primary winding 107, is able to change the transformation ratio of the regulator transformer providing very smooth regulation and a wider range for voltage regulation.

The RC circuits comprise the set of capacitors 113 and resistors 114 connected in series between each other and in parallel with switches 108, 110 and 109, 111. An RC circuit is connected in parallel with the power switch 108 and is located between the power source input and the point of connection of the power switch 108 and the output of the primary winding 107; another RC circuit is connected in parallel with the power switch 109 and is located between the load output and the point of connection of the power switch 109 and the input of the primary winding 107; another RC circuit is connected in parallel with the power switch 110 and is located between common return and the point of connection of the power switch 110 and the output of the primary winding 107; another RC circuit is connected in parallel with the power switch 111 and is located between the common return and the point of connection of the power switch 111 and the input of the primary winding 107. The function of the first capacitor 112 and the RC circuits is to provide reliable and safe system operation during switching transient (when switches 108, 109, 110 and 111 change between open and close positions) to avoid saturation of the regulator transformer 115 and eliminate any failure (breakdown) in the primary winding insulation due to an overvoltage.

The voltage regulator shown in FIG. 1 is a single phase AC voltage regulator, but those skilled in the art will appreciate that the present invention is likewise applicable to multi-phase power. For example, a three phase configuration of the present invention can be implemented using separate circuits like that shown in FIG. 1 for regulating the voltage of each phase independently. A common control circuit may be used to control all three power circuits. The voltage regulation circuits can be connected in three phase or multi-phase circuits. The voltage regulator further may comprise n-power circuits connected in series and 2n-control circuits to provide very smooth and precise regulation of each phase independently.

A number of different connection modes to provide appropriate voltage regulation can be achieved. One of the modes may be termed as a normal connection mode. The regulator transformer 115 operates in this mode as an impedance coil with the parallel windings in electrical communication with each other. To achieve this mode of operation, switches 108 and 109 are maintained closed, and switches 110 and 111 are maintained open. The primary 107 and secondary 106 windings are connected in parallel with each other and in series with the load 103 having an electrical communication with each other. The secondary winding 106 has a very low impedance (the voltage drop from a few volts to fractions of a volt) and approximately the full voltage of the power source 101 passes to the load output 103.

A second connection mode may be termed as a step-down mode. In case the incoming voltage exceeds the designated limits for the load, the primary winding 107 and secondary winding 106 are connected to the power source 101 in such a way that the voltage delivered to the load 103 is reduced. To achieve this mode of operation switches 109 and 110 are closed and switches 108 and 111 are opened. The voltage induced in the secondary winding 106 opposes that of the applied voltage, and the voltage delivered at the load output 103 will be decreased and equal to the difference between the power source voltage and the voltage induced by the primary winding 107 in the secondary winding 106.

In a step-up connection mode, incoming voltage that falls below the designated limits for the load is increased. To achieve this mode of operation switches 108 and 111 are closed and switches 109 and 110 are opened. The voltage delivered to the load 103 is equal to a sum of the applied voltage and the voltage induced by the primary winding 107 in the secondary winding 106.

During the switching transition (also referred to as the "transient") from the normal connection mode to the step-down connection mode, while switch 108 is opened and switch 110 is not yet closed, the secondary winding 106 causes significant electromotive force into the primary winding 107 due to a load current. The circuit of the primary winding 107 is never discontinued due to its electrical communication with the power source 101 and common return 120 through the RC circuits (capacitors 113 and resistors 114). In this configuration, the demagnetizing current flows in the primary winding 107 through the capacitor 112. As a result, the regulating transformer 115 is never saturated and a potential failure in the primary winding insulation due to an overvoltage is eliminated. The currents during the switching transition are restricted by the resistors 114. When the switch 110 is closed the step-down connection mode is achieved.

Similarly, during the switching transition (transient) from the normal connection mode to the step-up connection modes, while switch 109 is opened and the switch 111 is not yet closed, the secondary winding 106 causes significant electromotive force due to a load current into the primary winding 107. The circuit of the primary winding 107 is never discontinued due to its electrical communication with the power source 101 and the common return 120 through the RC circuits (capacitors 113 and resistors 114). The current flows in the primary winding 107 through the capacitor 112. As a result the regulating transformer 115 is never saturated and a potential failure in the primary winding insulation due to an overvoltage is eliminated. When the switch 111 is closed the step-up connection mode is achieved.

While returning to the normal connection mode, the switches are positioned and opened/closed in reverse order. The primary winding 107 is connected in parallel to the secondary winding 106 through the RC circuits during the switching transition. The current during this transition will be significantly reduced (nearly 10 times compare with the short-circuited topologies) and as a result no sparking, burning contacts or other known disadvantages are observed, which significantly increases the reliability and longevity of the system compared to previous systems.

In the step-down and step-up connection modes, the voltage regulator 100 performs as a boosting or bucking autotransformer and a bulk of the energy is transferred from the power source 101 to the load 103 by the means of electric coupling and a small part by the means of electromagnetic coupling. This ratio depends on the transformation ratio of the regulator transformer 115. The bigger the transformation ratio is the more energy that is transferred to the load 103 by the way of electric coupling. Depending on the load, the optimal transformation ratio is calculated to provide appropriate voltage regulation.

Generally, a desired AC voltage for a load means being within a predetermined range (load conditions) usually determined by a customer or local standards. However, optimal saving and performance can be achieved by maintaining an output voltage at the lower limit of the service voltage, typically supplied by utilities, within established operating tolerances, whereby the transformation ratio of the regulator transformer defines the predetermined range of the output voltage. The voltage will be appropriately regulated and delivered to the load even if the incoming AC power voltage falls outside the service voltage limits.

The design features all together provide the benefits and advantages associated with the achievement of this invention, such as, high efficiency (no less than 99.5%), reduced physical size and weight (which results in lower manufacturing cost), reduced energy consumption (and thus cost savings), and prolonged load equipment life.

It should be noted that all the foregoing descriptions and the schematic in FIG. 1 depict the concept of this invention for but one AC phase unless otherwise stated. If more than one AC phase is to be provided with the subject voltage regulation, one such piece of equipment will be required for each phase in a self-explanatory manner. A control circuit can monitor all the phases of power simultaneously or each phase independently.

Figure 2:
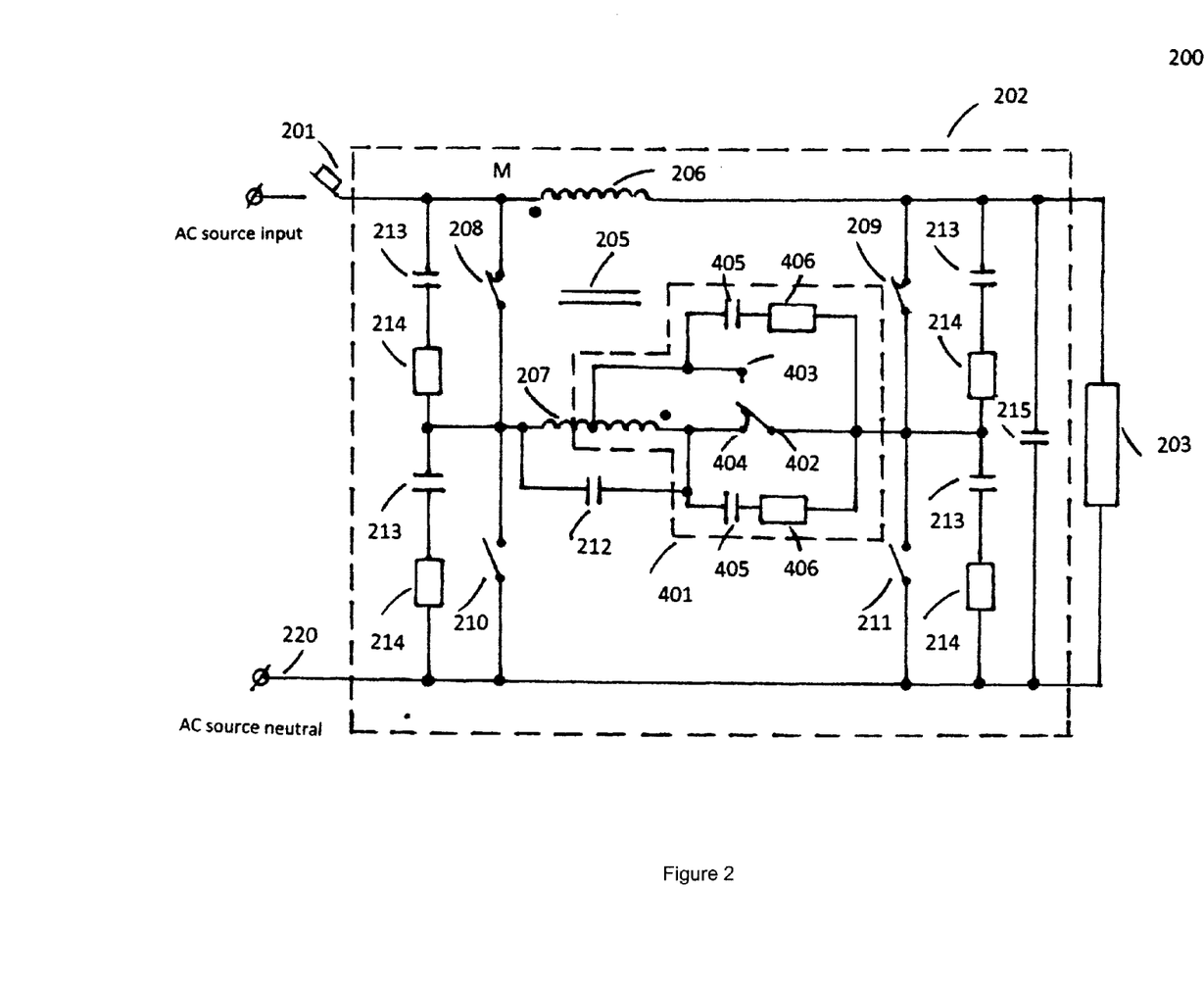
FIG. 2 is a schematic of an AC voltage regulator in one embodiment of the present invention comprising a power circuit able to deliver voltage within a predetermined range to a load.

FIG. 2 is an electrical schematic of a single phase AC voltage regulator in one embodiment of the present invention comprising a power circuit able to deliver voltage within a predetermined range to a load. The high efficiency AC voltage regulator 200 is designed to maintain the voltage level within a predetermined range for use in any type of a given load without any output power interruptions during any regulation period and without distortion of the AC sine wave. As shown, the AC voltage regulator 200 incorporates a protection circuit 201, a power circuit 202, and the load 203. The load 203 can be any kind of electrical load. The voltage regulator 200 includes a relay control circuit 300 (shown in FIG. 3).

The power circuit 202 comprises a regulator transformer 205, a plurality of power switches 208, 210 and 209, 211, a tapped relay 401, a first capacitor 212 and a second capacitor 215, whereby the transformation ratio of the regulator transformer 205 defines the predetermined range. The tapped relay 401 includes a plurality of RC circuits comprising capacitors 405 resistors 406.

The regulator transformer 205 has a primary winding 207 and a secondary winding 206. The input of the primary winding 207 of the regulator transformer 205 is connected to the output of the secondary winding 206 of the regulator transformer 205 through the tapped relay 401 and the power switch 209. The output of the primary winding 207 is connected to the input of the secondary winding 206 through switch 208 and further connected across the AC line through the protection circuit 201. The input of the secondary winding 206 is connected to the AC power line through the protection circuit 201, and the output of the secondary winding 206 is connected to the load 203.

The secondary winding 206 is connected in parallel with the primary winding 207 through the power switches 209 and 208. Switches 210 and 211 are in series with the switches 208 and 209, respectively, and switches 210 and 211 are further connected to the common return 220. The switches 208 and 209 are preferably, normally closed, while the switches 210 and 211 are normally open.

The tapped relay 401 is coupled to the primary winding 207 of the regulator transformer 205 and comprises common contact 402, normally-open contact 403, normally-closed contact 404 and two RC circuits containing capacitors 405 and resistors 406. The first of these RC circuits is connected between the contact 404 and contact 402, the second RC-circuit is connected between the contact 403 and the contact 402. The function of the tapped relay 401 is to change the transformation ratio of the regulator transformer 205 either manually or automatically via the control circuit 300 (shown in FIG. 3). The common contact 402 can connect to either the normally-closed contact 404 or the normally open contact 403. When common contact 402 is connected to the normally-closed contact 404, a full amount of turns in the primary winding 207 is provided. When common contact 402 is connected to the normally open contact 403, the amount of turns in the primary winding 207 is reduced, thus providing very smooth regulation and a wider range for voltage regulation which can be critical in electronics application, for example. Multiple taps can be utilized in the tapped relay 401.

The first capacitor 212 is connected in parallel with the primary winding 207 through tapped relay 401. The second capacitor 215 is connected to the output of the secondary winding 206 and to the common return 220. The second capacitor 215 is in parallel with the load 203. The second capacitor 215 serves for reactive current compensation (full or partial), decreasing nominal current and power of the voltage regulator and as result its cost.

The protection circuits 201 and 301 (shown in FIG. 3) are of a conventional type and, therefore, not described in detail.

Figure 3:
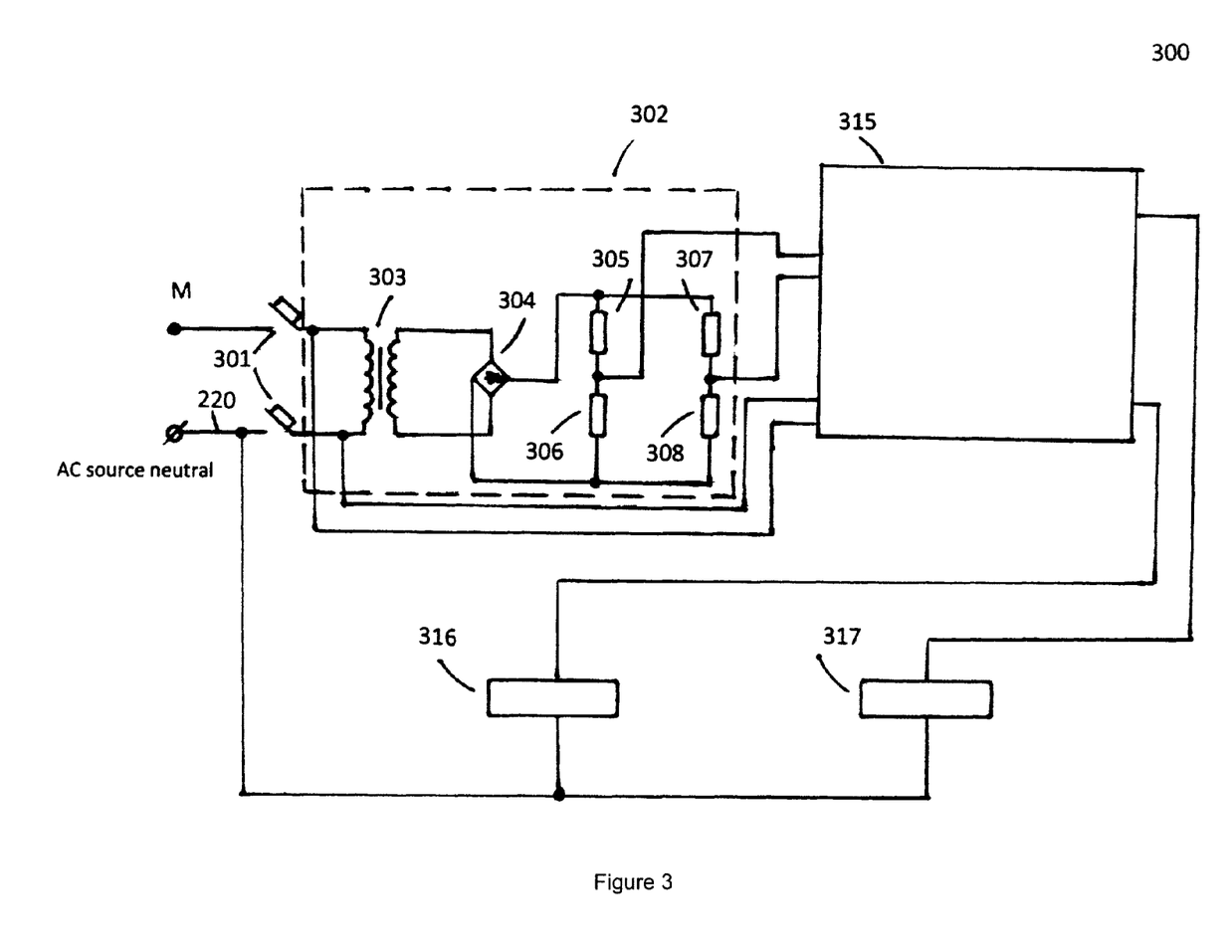
FIG. 3 is a schematic of a control circuit used with the voltage regulator shown in FIG. 2.

A control circuit 300 suitable for use with the voltage regulator 200 is depicted in FIG. 3, and includes a two pole circuit-breaker 301 (a type of protection circuit), a voltage sensor 302 comprising a step-down transformer 303, a diode bridge 304, an unbalanced resistive bridge consisting of resistors 305, 306, 307 and 308, a microcontroller 315, a first relay coil 316 (which controls switches 208 and 210), and a second relay coil 317 (which controls switches 209 and 211). The voltage sensor 302 is connected between the AC power source input and microcontroller 315, the microcontroller 315 is connected between the voltage sensor 302 and the relay coils 316, 317 and is powered from the AC power source, the relay coils 316, 317 are coupled to the microcontroller 315 from one side and to the common return 220 from another. A primary winding of the step-down transformer 303 is connected via the protection circuit 301 to the input of the secondary winding 206 of the regulator transformer 205 at a point M (shown in FIG. 2) and to the common return 220. The secondary winding of the step-down transformer 303 is also connected to the input of the diode bridge 304, which positive output is coupled to the point of connection of resistors 305 and 307. The negative output of the diode bridge 304 is coupled to the point of connection of resistors 306 and 308. The resistors of the unbalanced resistive bridge are connected as follows: the resistor 305 is connected to the resistors 307 and 306, the resistor 306 is connected to the resistors 305 and 308, the resistor 307 is connected to the resistors 305 and 308 and the resistor 308 is connected to the resistors 306 and 307. The voltage sensor 302 is further connected to the microcontroller 315. A conventional type microcontroller 315 comprises an input unit, logic units, and a power supply. The microcontroller 315 controls the relay coils 317 and 316, which control the switches 208, 209, 210 and 211 of the power circuit 202.

The AC input voltage enters the voltage sensor 302 via the protection unit 301, the step down transformer 303 reduces the incoming voltage which further is rectified by the diode bridge 904. Rectified voltage enters the unbalanced resistive bridge consisting of the resistors 905-908 providing constant voltage at the bridge output within, preferably 0-1 volts range which is further is analyzed by the microcontroller 315 and produces a control signal to the relay coils 316, 317 to selectively activate switches 208, 210 and 209 and 211 in order to operate in the mode (normal, step-up or step-down) necessary to provide output voltage to the load 203 that falls within the predetermined desired range. The control circuit 300 may also be used to control tapped relay 401 to select the proper transformation ratio to further adjust the output voltage.

All publications mentioned in this specification are indicative of the level of skill in the art of this invention. All publications are herein incorporated by reference to the same extent as if each publication was specifically and individually indicated to be incorporated by reference.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by the preferred embodiments and optional features, modification and variation of the concepts herein disclosed may be resorted to by those skilled in the art, and that such modifications and variations are considered to be within the scope of this invention as defined by the appended claims.

We claim:

1. An AC voltage regulator providing a specific desired voltage output, comprising:
   (a) a power source input suitable to being electrically connected to an AC power source;
   (b) a load output suitable to being electrically connected to a load;
   (c) a power circuit comprising a regulator transformer having a primary winding and a secondary winding, wherein said secondary winding is connected in series with the power source input and the load output, and said primary winding is connected with the power source input such that the primary winding and the secondary winding have opposite polarities, wherein said power circuit is configured to perform voltage regulation without any output power interruptions during any transition time, without distortion of AC sine waves, and without high current circulating through circuit components during transient; and
   (d) a control circuit in electrical communication with the power source input and the power circuit for monitoring an input voltage entering the AC voltage regulator from the AC power source and initiating appropriate voltage switching in the power circuit resulting in a voltage output within a predetermined range, wherein the control circuit comprises:
      (1) a voltage sensor comprising a step-down transformer, a diode bridge and an unbalanced resistive bridge;
      (2) a first and second relay coil; and
      (3) a microcontroller coupled to the AC power source, said microcontroller having an input and an output,
   wherein an input of the voltage sensor is connected via a protection circuit to the AC power source and to an input of the secondary winding of the regulator transformer; an output of the voltage sensor is connected to the microcontroller input; the microcontroller output is coupled to the first and second relay; and the first and second relay are further coupled to a common return.

2. The voltage regulator of claim 1 wherein said power circuit further comprises:
   (a) a first power switch positioned between the input of the secondary winding and an output of the primary winding;
   (b) a second power switch positioned between an input of the primary winding and an output of the secondary winding;
   (c) a third power switch positioned between the output of the primary winding and the common return; and
   (d) a fourth power switch positioned between the input of the primary winding and the common return,
   wherein when the first and second power switches are closed and the third and fourth power switches are open, the primary and secondary windings are in parallel, electrically coupled to each other, and the voltage across the load output is equal to voltage from the power source,
   wherein when the second and third power switches are closed and the first and fourth power switches are open, the voltage across the load output is equal to the difference between the voltage from the power source input and voltage induced by the primary winding in the secondary winding, and
   wherein when the first and fourth power switches are closed and the second and third power switches are open, the voltage across the load output is equal to the sum between the voltage from the power source input and voltage induced by the primary winding in the secondary winding.

3. The voltage regulator of claim 2 further comprising a plurality of RC circuits connected in parallel with said power switches, wherein each RC circuit comprises a capacitor and a resistor connected in series with each other.

4. The voltage regulator of claim 3 further comprising: an RC circuit connected in parallel with the first power switch and located between the power source input and a point of connection between the first power switch and the output of the primary winding; an RC circuit connected in parallel with the second power switch and located between the load output and a point of connection between the second power switch and the input of the primary winding; an RC circuit connected in parallel with the third power switch and located between the common return and a point of connection between the third power switch and the output of the primary winding; and an RC circuit connected in parallel with the fourth power switch and located between the common return and a point of connection between the fourth power switch and the input of the primary winding.

5. The voltage regulator of claim 1 wherein said power circuit further comprises a tapped relay having one or more tap points coupled to the primary winding, wherein said tapped relay is able to change the transformation ratio of the regulator transformer.

6. The voltage regulator of claim 1 further comprising a capacitor connected in parallel with the primary winding.

7. The voltage regulator of claim 1 further comprising a capacitor connected in parallel with the load and electrically connected to the load output and the common return.

8. The voltage regulator of claim 1 further comprising a tapped relay having one or more tap points coupled to the primary winding and two or more RC circuits, wherein said tapped relay is able to change the transformation ratio of the regulator transformer manually or via the control circuit.

9. The voltage regulator of claim 1 wherein a ratio of turns between the primary winding and secondary winding of the regulator transformer defines the predetermined range.

10. The voltage regulator of claim 1 wherein an optimal predetermined range is a service voltage supplied by utilities within established operating tolerances.

11. The voltage regulator of claim 1 wherein the voltage regulator operates as an energy saving device when the output voltage is maintained at the lower limit of the predetermined range.

12. The voltage regulator of claim 1 comprising a plurality of power circuits, wherein each power circuit comprises a regulator transformer having a primary winding and a secondary winding, wherein the secondary winding of each power circuit is connected in series with the power source input and the load output, and the primary winding of each power circuit is connected with the power source input such that in each power circuit the primary winding and the secondary winding have opposite polarities, and wherein each power circuit comprises: a first power switch positioned between the input of the secondary winding of that power circuit and an output of the primary winding of that power circuit; a second power switch positioned between an input of the primary winding of that power circuit and an output of the secondary winding of that power circuit; a third power switch positioned between the output of the primary winding of that power circuit and the common return; and a fourth power switch positioned between the input of the primary winding of that power circuit and the common return.

13. The voltage regulator of claim 12 wherein the control circuit is in electrical communication with each of the plurality of power circuits and is able to initiate appropriate voltage switching in each of the power circuits.

14. The voltage regulator of claim 12 further comprising a plurality of control circuits, wherein each control circuit is in electrical communication with one of the power circuits and is able to initiate appropriate voltage switching in said power circuit.

15. A method of regulating voltage from an AC power source to a load without any output power interruptions during any transition time, without distortion of AC sine waves, and without high current circulating through circuit components during transient, said method comprising:
(a) measuring an input voltage from an AC power source to a power circuit;
(b) outputting a control signal to the power circuit; and
(c) producing a desired voltage at the load within a predetermined range,
wherein said power circuit is electrically connected to the AC power source and comprises a plurality of power switches, a plurality of RC circuits, a tapped relay, a load output suitable to being electrically connected to the load, and a regulator transformer, said regulator transformer having a primary winding and a secondary winding, wherein said secondary winding is connected in series with the AC power source and the load, and said primary winding is electrically connected to the AC power source via said power switches such that the primary winding and the secondary winding have opposite polarities, wherein said regulator transformer is operating in a normal mode while said measured input voltage is within a predetermined range and the primary winding is electrically connected in parallel with the secondary winding causing voltage across the load output to be equal to the input power source voltage, and wherein the step of measuring an input voltage from an AC power source comprises reducing the input power source voltage using a step-down transformer; rectifying the reduced input voltage using a diode bridge electrically connected to the step-down transformer; producing a constant voltage of regulated magnitude at a diagonal of an unbalanced resistive bridge electrically connected to the diode bridge; and analyzing the transformed input voltage from said resistive bridge.

16. The method of claim 15 wherein the step of outputting a control signal to the power circuit comprises:
(a) selectively activating a power switches in the power circuit;
(b) redirecting current through the power circuit so that the primary winding induces a voltage in the secondary winding thereby causing the power circuit to operate in a step-up mode when said measured input voltage is below said predetermined range causing voltage across the load output to be equal to a sum between the input power source voltage and the voltage induced by the primary winding in the secondary winding; and
(c) maintaining an electrical connection between the primary winding and the AC power source during the transition from the normal mode of operation to the step-up mode of operation and during the transition from the step-up mode of operation to the normal mode of operation via the plurality of RC circuits and the capacitor.

17. The method of claim 15 wherein the step of outputting a control signal to the power circuit comprises:
(a) selectively activating a power switches in the power circuit;
(b) redirecting current through the power circuit so that the primary winding induces a voltage in the secondary winding thereby causing the power circuit to operate in a step-down mode when said measured input voltage is above said predetermined range causing voltage across the load output to be equal to a difference between the input power source voltage and the voltage induced by the primary winding in the secondary winding; and
(c) maintaining an electrical connection between the primary winding and the AC power source during the transition from the normal mode of operation to the step-down mode of operation and during the transition from the step-down mode of operation to the normal mode of operation via the plurality of RC circuits and the capacitor.

18. The method of claim 15 wherein the predetermined range is defined as a ratio of a number of turns in the primary winding to a number of turns in the secondary winding of said regulator transformer defining a voltage variation above or below a nominal AC voltage.

19. The method of claim 15 wherein an optimal predetermined range is defined as a service voltage supplied by utilities within established operating tolerances, whereby a transformation ratio of said regulator transformer defines said predetermined range.

* * * * *